United States Patent
Yamamoto et al.

(10) Patent No.: US 7,163,756 B2
(45) Date of Patent: Jan. 16, 2007

(54) MAGNETIC RECORDING MEDIUM

(75) Inventors: Tomoo Yamamoto, Odawara (JP); Yotsuo Yahisa, Odawara (JP); Tatsuya Hinoue, Odawara (JP); Hidekazu Kashiwase, Yokohama (JP); Tetsuya Kanbe, Odawara (JP); Hiroyuki Suzuki, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 30 days.

(21) Appl. No.: 10/733,928

(22) Filed: Dec. 10, 2003

(65) Prior Publication Data
US 2004/0214049 A1    Oct. 28, 2004

(30) Foreign Application Priority Data
Apr. 23, 2003   (JP)   ............................ 2003-118582

(51) Int. Cl.
*G11B 5/66*   (2006.01)
(52) U.S. Cl. ............................................ 428/831
(58) Field of Classification Search .......... 428/694 TS, 428/694 TM, 611, 668, 336, 900, 667, 831, 428/831.1, 831.2
See application file for complete search history.

(56) References Cited

U.S. PATENT DOCUMENTS 6,562,489 B1   5/2003   Abarra et al.
6,599,642 B1 *  7/2003   Bian et al. .................. 428/611
6,602,612 B1   8/2003   Abarra et al.
2001/0018136 A1   8/2001   Bian et al. ............. 428/694 TS
2002/0119350 A1 *  8/2002   Tomiyasu et al. ...... 428/694 TS
2003/0152810 A1 *  8/2003   Kawai et al. ............... 428/695

FOREIGN PATENT DOCUMENTS

| JP | 2001-056924 | 2/2001 |
| JP | 2001-143250 | 5/2001 |
| WO | WO00/60583 | 10/2000 |

* cited by examiner

*Primary Examiner*—Holly Rickman
(74) *Attorney, Agent, or Firm*—Townsend and Townsend and Crew LLP

(57) ABSTRACT

A large-capacity, low-cost, longitudinal magnetic recording medium capable of ultra-high-density recording of 70 Gigabits or more per square inch is disclosed. The longitudinal magnetic recording medium of the present invention comprises a first seed layer, a second seed layer, a first underlayer, a second underlayer, and a magnetic layer, which are formed on a nonmagnetic substrate in this order. A material containing at least Al and any one of Ru and Re is used to form the second seed layer, and a material containing at least any one of Co and Ni and one or both of Al and Ti is used to form the first underlayer. It is also possible to use Cr or a Cr alloy containing Cr and at least one element selected from the constituent element group A consisting of Ti, Mo, and W for forming the second seed layer.

13 Claims, 11 Drawing Sheets

MAGNETIC RECORDING MEDIUM

CROSS REFERENCE TO RELATED APPLICATIONS

This application is related to an claims priority from Japanese Application No. 2003-118582, filed Apr. 23, 2003.

BACKGROUND OF THE INVENTION

The present invention relates to longitudinal magnetic recording media, such as magnetic drums, magnetic tapes, magnetic disks, and magnetic cards, and magnetic recording devices. In particular, the present invention relates to a longitudinal magnetic recording medium suitably used for ultrahigh-density recording of 70 Gigabits or more per square inch.

Owing to popularization of the Internet vis-à-vis the World Wide Web (WWW), the demand for magnetic disk devices is increasing along with the increase in the number of personal computers on the market. Although it is possible to access the Internet from mobile terminals as well as from personal computers, it is necessary to incorporate a magnetic disk device into a mobile terminal to pursue further convenience of the mobile terminals. It is expected that the demand for mobile terminals provided with magnetic disk devices will increase in the future. Further, because of the impending digitalization of TV broadcasting, a full-scale use of the magnetic disk device as a recording device has already started. The applicable field of the magnetic disk device is thus extending, and end users are requesting magnetic disk devices of reduced size and significantly increased capacity.

A reduction in noise of the longitudinal magnetic recording medium is efficient means for achieving the high recording density of the magnetic disk device. In order to realize the reduction in noise, it is very important to refine magnetic crystal particles. However, when the volume of a crystal particle becomes extremely small, due to refinement of the magnetic crystal particles, the magnetic crystal particles are susceptible to thermal energy even at an ordinary temperature, so that recorded magnetization decays over time. This phenomenon is generally called "thermal fluctuation." The index used to indicate resistance to thermal fluctuation is $Ku \cdot v/kT$. This index indicates how many times the product of anisotropic energy $Ku$ of a magnetic body and a volume $v$ of a magnetic crystal particle is greater than room temperature energy $kT$. The larger the value of this index, the greater the thermal stability. There are various methods for measuring $Ku \cdot v/kT$. In the method employed in embodiments of the present invention, it is obtained in accordance with the time dependence of remnant coercive force (Hr).

It is impossible to satisfy the function of a recording device if the recorded information is lost; therefore, a medium having a structure described in Japanese Patent Laid-open No. 2001-56924 has been proposed as a countermeasure.

This medium disclosed in Japanese Patent Laid-open No. 2001-56924 is generally known as an AFC (antiferromagnetically coupled) medium, which comprises at least two magnetic layers with an intermediate layer formed from Ru or the like interposed therebetween. In a state where no magnetic field is externally applied, an upper magnetic layer and a lower magnetic layer are antiferromagnetically coupled by Ru. In short, magnetizations of the upper layer and the lower layer are antiparallel to each other. Such specific magnetic coupling is realized by optimizing a thickness of Ru. Further, since the medium noise is reduced with a reduction in antimagnetic field encountered in a magnetization transition region, it is possible to reduce the medium noise simply by maintaining the product (Br·t) of a remnant magnetic flux density and a magnetic film thickness at a small value. Since the upper magnetic layer and the lower magnetic layer are antiferromagnetically coupled in the AFC medium, an effective value of Br·t is the difference between the upper and lower magnetic layers. Accordingly, since it is possible to reduce Br·t without extremely reducing the volume of a magnetic crystal particle via the AFC medium, the medium noise can be reduced with the thermal fluctuation resistance being secured.

At present, glass is often used as a substrate of the magnetic disk medium. When using a glass substrate, a seed layer to be formed thereon has an important function in controlling the crystal orientation of a magnetic layer. In an ordinary longitudinal magnetic recording medium, Co having an hcp crystal structure is often used as a main component of the magnetic material, and its easy axis of magnetization is in the direction of the c-axis. In order to simultaneously secure thermal fluctuation resistance and improve recording density in the longitudinal recording medium, it is particularly important to positively orient the easy axis of magnetization in the film. PCT Publication No. WO00/60583 and Japanese Patent Laid-open No. 2001-14325 each propose TiTl as a seed layer material (to be formed directly on the substrate) for positively longitudinally orienting the c-axis of a magnetic layer having an hcp structure.

The recording medium disclosed in PCT Publication No. WO00/60583 has a structure in which a TiAl layer is formed on a substrate. A magnetic film is formed directly on the TiAl layer or with an underlayer of Cr or with a Cr alloy disposed therebetween.

The recording medium disclosed in Japanese Patent Laid-open No. 2001-14325 has a substantially similar structure, but an example of forming the TiAl layer indirectly on the substrate is disclosed therein. For example, a recording medium structure of Cr-based underlayer/TiAl underlayer/Cr-X seed layer/NiP layer/substrate is disclosed in Example 1. Further, a structure of magnetic film/CoCr layer/Cr-based intermediate layer/TiAl underlayer/B2 structure seed layer/substrate is disclosed in Example 3.

Examples of two-layered seed layers wherein a RuAl seed layer is formed on each of TiAl, CrTa, and AlTa seed layers are disclosed in U.S. Patent Application Publication No. 2001/008136. The recording medium includes a CrTi layer formed as an underlayer of the RuAl seed layer.

A study was carried out to realize a recording medium having thermal fluctuation resistance and high recoding density by using the AFC structure and by strongly orienting the easy magnetization axis of a magnetic film . According to our study, in order to assure reliable performance of a magnetic disk device, particularly in order to prevent the recorded information from deteriorating due to the influence of thermal fluctuations, it is necessary to keep the value of $Ku \cdot v/kT$ at 70 or more. Our study confirmed that the orientation of the magnetic film improved to achieve a satisfactory thermal fluctuation property by using a two-layered seed layer, including the RuAl seed layer, which is disclosed in Patent Document 4. It was also confirmed that $Ku \cdot v/kT$ depends greatly on the first seed layer material and the thickness of the RuAl seed layer, and that the RuAl seed layer thickness must be 12 nm or more. However, since Ru is very expensive and should be used in a ratio of 1:1 to Al, the use of Ru entails a remarkable increase in cost of the medium. Further, in order to increase the thickness of the RuAl seed layer, input power must be increased for sputtering, thereby causing problems of increases in dust and defects.

BRIEF SUMMARY OF THE INVENTION

An object of the present invention is to provide, at low cost, a longitudinal magnetic recording medium which realizes a high recording density while securing a satisfactory thermal fluctuation resistance and a reduction in defects.

In accordance with the present invention, a longitudinal magnetic recording medium has a first seed layer, a second seed layer, a first underlayer, a second underlayer, and a magnetic layer which are formed on a nonmagnetic substrate in that order. A material at least containing Al and any one of Ru or Re is used to form the second seed layer and a material at least containing any one of Co and Ni and one or both of Al and Ti is used to form the first underlayer.

The magnetic layer may preferably have an AFC structure wherein an intermediate layer is formed from Ru, Cr, Rh, Ir, Cu, or an alloy thereof, and a lower magnetic layer and an upper magnetic layer are antiferromagnetically coupled to each other. Alternatively, the present invention may be realized by other magnetic layer structures than the AFC structure.

DETAILED DESCRIPTION OF THE INVENTION

Figure 1:
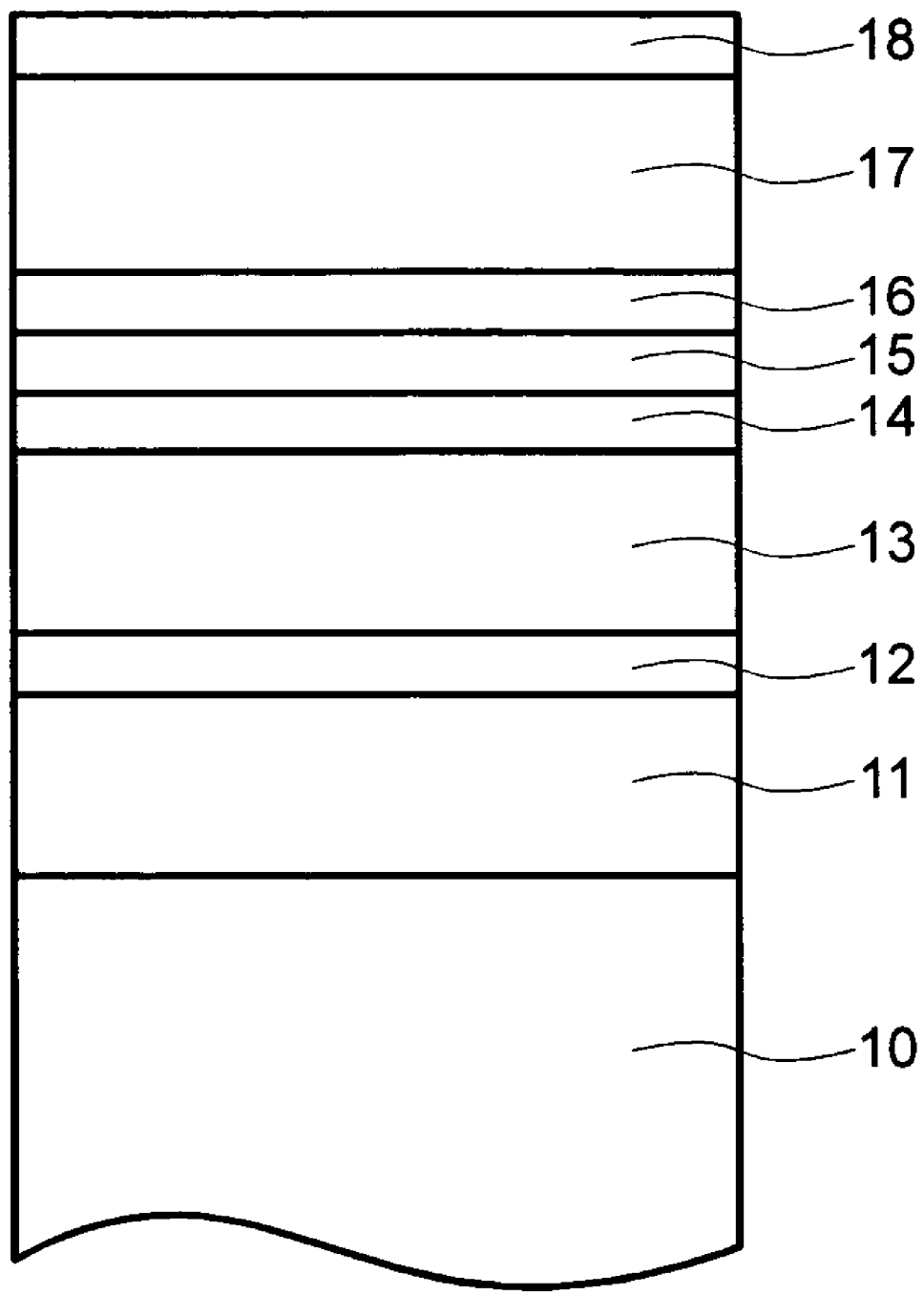
FIG. 1 is a sectional view schematically showing one embodiment of a longitudinal magnetic recording medium according to the present invention.

One of the optimum materials to be used as the first seed layer is TiAl. The preferred ratio between Ti and Al is 1:1 or close to 1:1 to control orientation of the second seed layer which is formed on the first seed layer. The structure of TiAl differs depending on its formation process. An L10 crystal structure is formed when a temperature of the substrate is kept high for a relatively long period of time after the formation of TiAl. On the other hand, a crystallite structure or an amorphous structure is formed when the substrate temperature is lowered in a relatively short period of time. A mass production system in which production time per medium was short was used in the embodiments of the present invention. In these cases, since the substrate temperature was cooled down relatively rapidly, TiAl had the crystallite structure or the amorphous structure. When the TiAl was formed by a batch sputtering apparatus, a crystalline film was obtained. From these results, it was discovered that the orientation of the magnetic film is not changed by the structure of TiAl and that the use of the material TiAl is of importance. Further, a study was performed on a material obtained by adding B to TiAl. It was discovered that a layer formed from this material has a tendency to reduce noise in the recording medium although structural change of the medium was not clarified. A study was also performed on ranges of the ratio between Ti and Al other than 1:1 (from 35 to 65% atomic weight of Ti and from 35 to 65% atomic weight of Al, i.e. $Ti_xAl_{(1-x)}$, where x ranges from 0.35 to 0.65), but no difference was observed in the structure and the noise. From the above results, it was found preferable to use from 35 to 65% atomic weight of Ti and from 35 to 65% atomic weight of Al in view of addition of a third element when TiAl is used to form the seed layer. If the compositions of Ti and Al are out of the above-identified ranges, a so-called segregation structure wherein particles formed independently of Ti or Al results. From this basis, the upper limit and the lower limit of the compositions of Ti and Al were determined.

A material at least containing Cr and one or both of Ti and Ta may be used to form the first seed layer. More specifically, the material may be CrTi, CrTa, CrTiTa, or a material obtained by adding another element thereto. An element commonly contained in each material is Cr, and it is preferable to maintain a concentration of Cr in the range of 35 to 70% atomic weight to control orientation of the second seed layer formed on the fist seed layer.

It is important to use RuAl or ReAl having a B2 crystal structure as the second seed layer. The ratio of Ru to Al and the ratio of Re to Al, each may preferably be 1:1 or close to 1:1. However, the composition ratio may not always be kept in this range because the crystal particles can be refined by changing the ratio to a ratio not close to 1:1. Further, it is possible to add a third element in order to reduce a crystal particle diameter. It is important that the main components are Ru and Al or Re and Al in the present invention, and the type and a concentration of the third element is not crucial. However, the crystal orientation of the magnetic layer deteriorates if crystallinity of the second seed layer deteriorates and, therefore, the B2 structure is indispensable and an amount of the third element to be added should desirably be 10% atomic weight or less to achieve B2 structure. Thus, it is preferable to use from 35 to 65% atomic weight of Ru or Re and from 35 to 65% atomic weight of Al to form the second seed layer. If the composition is out of the above range, the crystallinity of the B2 structure of the second seed layer deteriorates to ultimately result in deterioration of the crystal orientation of the magnetic layer.

Both Ru and Re, which are main components of the second seed layer in addition to Al, are very expensive materials. From the standpoint of cost, it is preferable to omit the first underlayer and to increase the thickness of the second seed layer. Characteristics of the seed layer formed from the above materials are fine crystal particles and (100) preferred orientation achieved at the initial crystal growth stage. Further, the particle size increases with an increase in thickness in the general seed layers, but the degree of the increase in particle size is smaller in the seed layer formed by using Ru or Re as compared to that of the Cr alloy which is generally used as the underlayer. The seed layer containing Ru or Re contributes to the realization of a recording medium that exhibits reduced noise and excellent thermal fluctuation resistance. In order to achieve the crystal particle size which secures thermal fluctuation resistance, it is necessary to keep the thickness of the second seed layer to 12 nm or more. However, one of the objects of the present invention is to provide a low cost medium and, therefore, it is necessary to reduce the thickness of the second seed layer. The thickness of the second seed layer may preferably be 10 nm at thickest or less; more preferably, 5 nm or less. A lower limit of the thickness is 0.3 nm because the control of the orientation of the first seed layer will be difficult if the thickness is less than 0.3 nm.

Further, in the case of increasing the thickness of the second seed layer of RuAl or ReAl, dust and defect counts are increased due to increased input power for sputtering. Accordingly, the RuAl or ReAl layer needs to be thin to suppress the increase in defect counts, and the thickness may preferably be 10 nm at thickest or less. It is assumed that the dust is increased because RuAl or ReAl is a chemical material formed from Ru or Re which has a high melting point and Al which has a low melting point. In the present invention, it is possible to largely reduce the influence of the dust by setting the thickness of the second seed layer of RuAl or ReAl to 5 nm or less (0.3 nm or more), thereby dramatically improving production yield of the medium.

One of the most important points of the present invention is to use one of CoAl, CoTi, NiAl, and NiTi each having a B2 structure and CoAlTi and NiAlTi each having an L21 structure as the first underlayer. Thanks to the second seed layer formed from RuAl or ReAl, the preferred orientation in the first underlayer is in the direction of (100). Further, since a crystal pattern is formed by the second seed layer, the crystallinity of the first underlayer is improved as compared to a medium without the second seed layer. In addition, since the crystal particles of the second seed layer are fine, initial crystal particles of the first underlayer are fine too. Like the second seed layer, the first underlayer is required to possess such properties that the particle size is easily controlled by adjusting its thickness and abnormal particle growth does not occur.

As a result of examination of various materials, it was found that only a limited number of materials simultaneously enable the easy control of the preferred orientation plane and the crystallinity of the second seed layer and easy control of the particle size of the first underlayer owing to the thickness adjustment, and that the above-described materials are suitably used. It is possible to add another element to the first underlayer in such an amount that the crystallinity of the first underlayer is not deteriorated. In view of the crystallinity, the composition of the first underlayer is as follows: When the material to be used has a B2 crystal structure, the material should have the composition of from 40 to 60% atomic weight of Co or Ni and from 40 to 60% atomic weight of Al or Ti. When the material has an L21 crystal structure, the material should have the composition of from 30 to 60% atomic weight of Co or Ni, from 20 to 30% atomic weight of Al, and from 20 to 30% atomic weight of Ti. If the composition is out of the above ranges, the B2 structure or the L21 structure is compromised, leading to deterioration of the crystallinity, thereby resulting in deterioration in longitudinal orientation of the easy magnetization axis of the magnetic layer.

The second underlayer is provided for the purpose of improving the orientation of the magnetic layer by reflecting the crystal orientation of the first seed layer to the first underlayer as it is to the magnetic layer and eliminating the mismatching between lattice structures of the first underlayer and the magnetic layer. Thus, the properties required of the second underlayer are good crystallinity and a composition which facilitates adjustment of the lattice constant. A material suitably used for the second underlayer is a Cr alloy, and conventional Cr alloys can be used as they are. Specific examples of the material are CrTi, CrV, CrMo, CrW, and materials obtainable by adding a B element to each of these Cr alloys. Since the combinations of the materials are limited in order to maintain the fine crystal particle size from the first seed layer to the first underlayer in the medium of the present invention, the particle size must not be increased by the formation of the second underlayer. Therefore, the thickness of the second underlayer is reduced as much as possible. The thickness of the second underlayer may preferably be from 2 to 10 nm, more preferably from 2 to 5 nm. If the thickness is less than 2 nm, the second underlayer does not function as an orientation control film for the magnetic layer even when the lattice adjustment is performed. If the thickness exceeds 10 nm, the particle size is undesirably increased.

Further, the above-described object is attained also by a longitudinal magnetic recording medium having a first seed layer, a second seed layer, a first underlayer, a second underlayer, and a magnetic layer which are formed in that order on a nonmagnetic substrate, wherein the second seed layer is composed of Cr or a Cr alloy containing an element selected from a constituent element group A consisting of Ti, Mo, and W, and the first underlayer contains at least any one of Co or Ni and one or both of Al and Ti.

The foregoing medium and this medium are different from each other in the material used for the second seed layer. In this medium, Cr or the Cr alloy is used as the second seed layer. Constituent elements of the Cr alloy are limited, and the Cr alloy is composed of at least one element selected from the constituent element group A consisting of Ti, Mo, and W. As described above, the crystal particle size of the Cr-based materials is significantly increased when the layer thickness is increased. However, since the preferred orientation in the Cr-based materials is in the direction of (100) to achieve an excellent orientation of the magnetic film, the second seed layer should be so thin that the film formation is terminated before the start of particle growth. Accordingly, the thickness of the second seed layer may preferably be 7.5 nm or less, more preferably 2.5 nm or less in view of the suppression of particle growth and the reduction in medium noise. Since the Cr alloy achieves strong (100) orientation even when it is formed into such ultra-thin film, it is limited in composition, and only the above-described materials should be selected for use.

The foregoing are the detailed descriptions of the medium structures and compositions of the first seed layer, the second seed layer, the first underlayer, and the second underlayer. The magnetic layer may preferably have the structure of an AFC medium, but it is possible to use a single-layered magnetic layer if a satisfactory $Ku \cdot v/kT$ is achieved by the use of the first seed layer, the second seed layer, the first underlayer, and the second underlayer of the present invention.

An example of the magnetic layer having the structure of an AFC medium is now described below. Magnetic materials to be used for the upper magnetic layer and the lower magnetic layer are not particularly limited, but the lower magnetic layer may preferably contain at least 70% atomic weight of Co. This is because the lower magnetic layer is required to have the function of canceling part of Br1·t1 of the upper magnetic film with Bs2·t2 of the lower magnetic layer to reduce Br·t of the whole medium. In this case, since Bs2 is reduced if the Co concentration of the lower magnetic layer is reduced, the amount of canceling becomes insufficient unless the thickness of the lower magnetic layer is increased. The increase in thickness of the lower magnetic layer causes a reduction in the coupled magnetic field (Hx) to undesirably lead to an increase in crystal particle size. Therefore, the Co concentration of the lower magnetic layer may preferably be 70% atomic weight or more. In view of the refinement of crystal particles, elements to be added to the lower magnetic layer may preferably be Cr, Pt, C, B, Si, Ta, Ti, Nb, and the like. Since the upper magnetic layer is the layer on which information is actually recorded, the upper magnetic layer may preferably contain at least 15 to 25% atomic weight of Cr and 4 to 23% atomic weight of Pt in order to attain a high medium coercive force and low medium noise. Further, the upper magnetic layer may preferably contain at least one element selected from the group consisting of C, B, Si, Ta, Ti, and Nb in an amount of 0.5 to 12% atomic weight in order to attain a high medium coercive force and a low medium noise. In particular, C, B, Si, and Ta are preferable since they have an effect of promoting segregation of Cr toward its grain boundary in the magnetic film. In the composition of the magnetic film, Co must be contained in at least an amount of 54% atomic weight or more. If the Co concentration is equal to or less than 54% atomic weight, the remnant magnetic flux density is remarkably reduced diminishing magnetic flux leaking from the medium, thereby making it difficult to read out signals with a magnetic head.

The recording media of the present invention are non-obvious modifications of the conventional AFC media. Since the recording media of the present invention have the structure of an AFC medium, it is desirable to use Ru, Cr, Rh, Ir, or Cu or an alloy thereof as the intermediate layer for antiferromagnetically coupling the upper magnetic layer and the lower magnetic layer.

In order to further reduce the noise of an AFC medium, it is effective to make an upper magnetic layer multilayered. More specifically, the upper magnetic layer is constituted of multiple magnetic layers and an intermediate layer formed from a nonmagnetic material is disposed between the adjacent magnetic layers. Since thermal demagnetization resistance is diminished in this case, it is necessary to increase the thickness of the upper magnetic layer as compared to the upper magnetic layer of ordinary AFC medium. Materials to be used for the intermediate layer disposed between the adjacent layers of the multilayered upper magnetic layer are not particularly limited as long as they are nonmagnetic materials that do not diminish the epitaxial growth of the magnetic layer. For example, the materials such as Ru, Cr, Rh, Ir, Cu, and an alloy thereof used for the intermediate layer of the AFC medium may be used as the intermediate layer of the multilayered upper magnetic layer. Alternatively, the Cr alloy used for the second underlayer, or conventionally well-known nonmagnetic CoCr and CoRu alloys may be used for the intermediate layer.

EXAMPLES

Example 1

Figure 2:
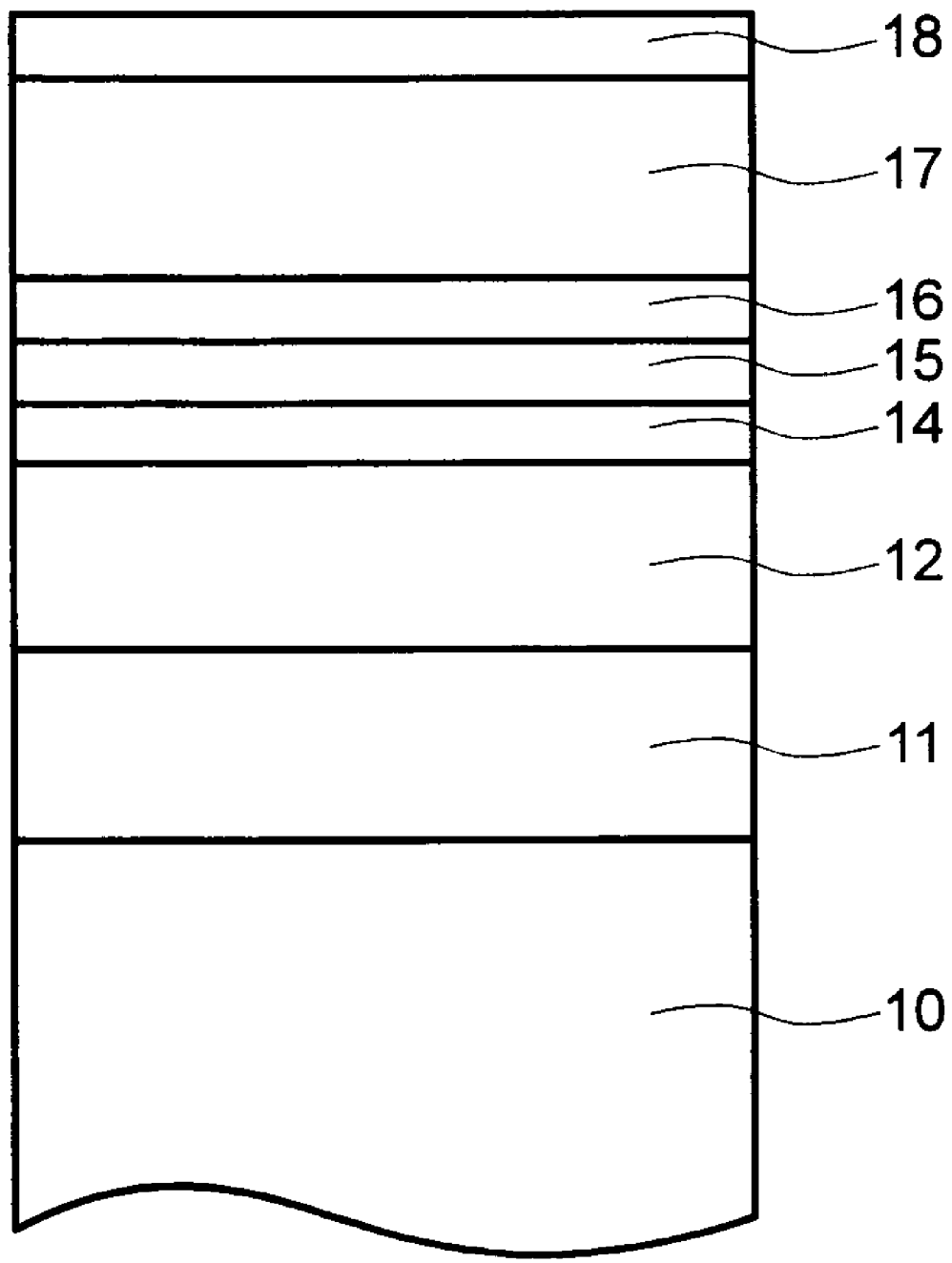
FIG. 2 is a sectional view schematically showing a longitudinal magnetic recording medium having a conventional structure.

Experiments were performed to find out the optimum combination for the first seed layer and second seed layer. FIG. 2 is a sectional view of longitudinal magnetic recording media used for the experiments. The layer structures of the media are described below. Each of the layers was formed by DC magnetron sputtering using the so-called single-wafer sputtering apparatus, which is capable of forming each of the layers in individual sputtering chambers. Ar was used as the main sputtering gas.

A first seed layer 11 composed of Ti and 52% atomic weight of Al ($TiAl_{0.25}$) and having a thickness of 30 nm was formed on a glass substrate 10 having an outer diameter of 65 mm. Then, after heating a surface of the first seed layer 11 with an infrared ray lamp to 300° C., a second seed layer 12 having a thickness of 30 nm was formed. In this case, material of the second seed layer was changed for each of the media. A second underlayer 14 composed of Cr and 20% atomic weight of Mo ($CrMo_{0.2}$) and having a thickness of 5 nm was formed on second seed layer 12. On second underlayer 14, a lower magnetic layer 15 composed of Co, 19% atomic weight of Cr, and 8% atomic weight of Pt ($CoCr_{0.19}Pt_{00.8}$), an Ru intermediate layer 16 having a thickness of about 0.6 nm, an upper magnetic layer 17 composed of Co, 18% atomic weight of Cr, 13% atomic weight of Pt, and 8% atomic weight of B ($CoCr_{0.18}Pt_{0.13}B_{0.08}$) and having a thickness of 15.5 nm, and a C protecting film 18 containing nitrogen and having a thickness of 3.5 nm were formed in this order.

Figure 3:
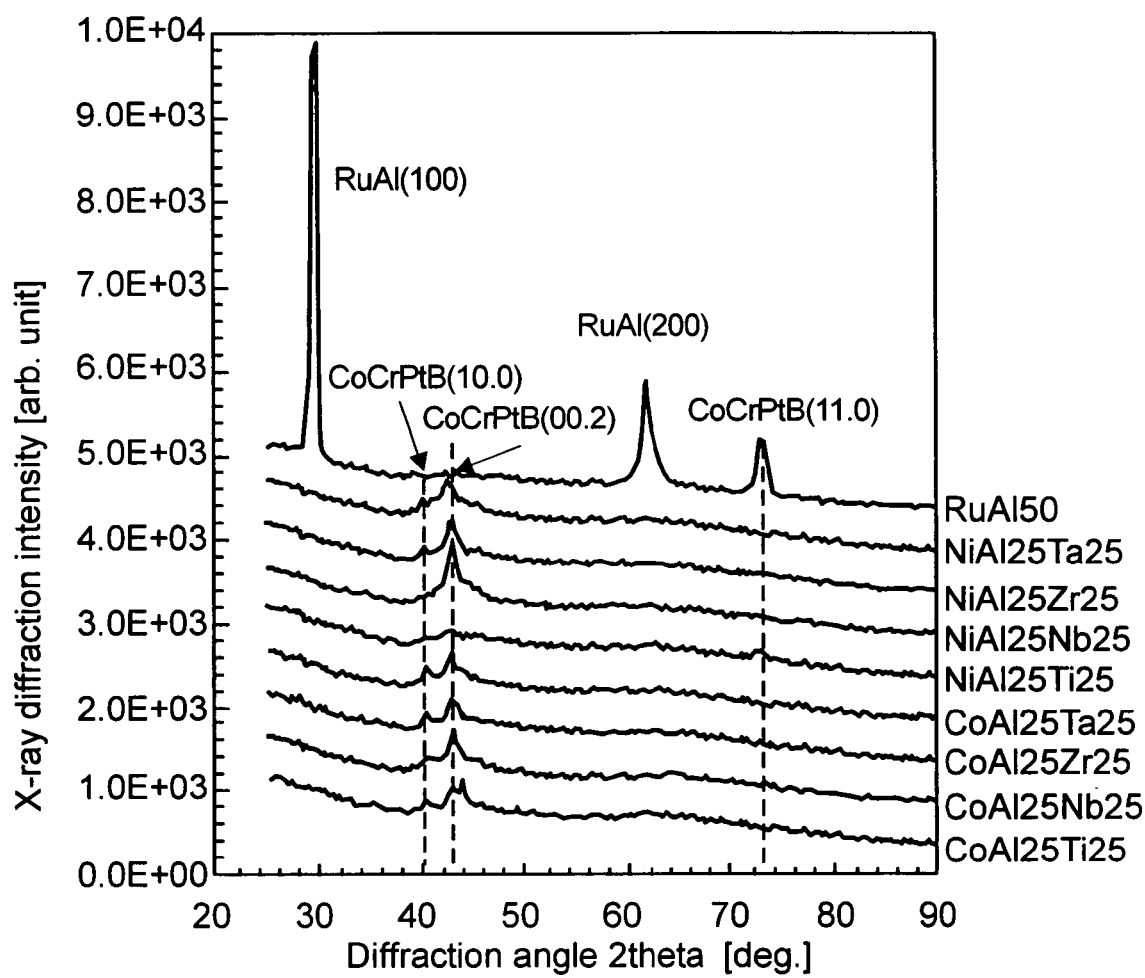
FIG. 3 is a graph comparatively showing crystal orientations achieved by using different materials for a second seed layer of Example 1.

Results of using second seed layer materials of: (1) Co, 25% atomic weight of Al, and 25% atomic weight of Ti ($CoAl_{0.25}Ti_{0.25}$); (2) Co, 25% atomic weight of Al, and 25% atomic weight of Nb ($CoAl_{0.25}Nb_{0.25}$); (3) Co, 25% atomic weight of Al, and 25% atomic weight of Zr ($CoAl_{0.25}Zr_{0.25}$); (4) Co, 25% atomic weight of Al, and 25% atomic weight of Ta ($CoAl_{0.25}Ta_{0.25}$); (5) Ni, 25% atomic weight of Al, and 25% atomic weight of Ti ($NiAl_{0.25}Ti_{0.25}$); (6) Ni, 25% atomic weight of Al, and 25% atomic weight of Nb ($NiAl_{0.25}Nb_{0.25}$); (7) Ni, 25% atomic weight of Al, and 25% atomic weight of Zr ($NiAl_{0.25}Zr_{0.25}$); (8) Ni, 25% atomic weight of Al, and 25% atomic weight of Ta ($NiAl_{0.25}Ta_{0.25}$); and (9) Ru and 50% atomic weight of Al ($RuAl_{0.5}$) are described below. Changes in crystal orientation depending on the materials of second seed layer 12 are shown in FIG. 3. As is apparent from FIG. 3, diffraction intensity of CoCrPtB (11.0) in second seed layer 12 formed from Ru, 50% atomic weight of Al is remarkably great and longitudinal orientation of the magnetic film is good. Some of the second seed layers formed from other materials are confirmed with CoCrPtB (11.0), but their orientations are remarkably weak as compared with that of the Ru, 50% atomic weight of Al.

A material composition of Ru and 50% atomic weight of Al exhibits clear (100) diffraction and (200) diffraction, so that the material is considered to have an excellent crystallinity. Although not shown in FIG. 3, similar results were obtained by the use of Re and 50% atomic weight of Al (R/W characteristic thereof will be described later in this specification). On the other hand, second seed layers 12 were confirmed with no clear diffraction peak for other materials and, therefore, they are considered to have poor crystallinity. Similar results were obtained by the use of Co and 50% atomic weight of Ti, Co and 50% atomic weight of Al, Ni and 50% atomic weight of Ti, Ni and 50% atomic weight of Al, Fe and 50% atomic weight of Ti, Fe and 50% atomic weight of Al, Fe and 50% atomic weight of V, and Mn and 50% atomic weight of V. That is, good results were obtained only by the use of Ru and 50% atomic weight of Al and Re and 50% atomic weight of Al.

The materials used for second seed layer 12 in the above experiments were intermetallic compounds based on bcc structure and having B2 structure or L21 structure. As a result of investigation of various literatures, elements that achieve B2 structure when mixed with Al are VIII group elements (Fe, Co, Ni, Ru, Rh, Pd, Os, Ir, and Pt) and Re. Al as a single element has an fcc structure, and each of Ru and Re as a single element has an hcp structure. Co and Ni can provide hcp structure depending on temperature, but such hcp structure transforms into fcc structure depending on other temperatures. Among the above elements, Ru, Re, and Os can provide hcp structure over entire temperature ranges. It is considered that B2 structure material composed of fcc compounds (Al) and hcp, compounds (Ru, Re, Os) are the optimum materials for the second underlayer achieving excellent crystallinity. However, since Os is inappropriate for industrial production due to its considerably strong toxicity, it was not studied further. In addition, Ru and Re have melting points of as high as 2334° C. and 3186° C., respectively, which possibly has influence on the crystallinity. High melting point materials in general have the effect of forming fine crystal particles, and, from this fact, Ru and Re are considered to be the optimum materials. For the above reasons, the materials to be used for second seed layer 12 are limited to those composed of Al and Ru or Re.

Figure 4:
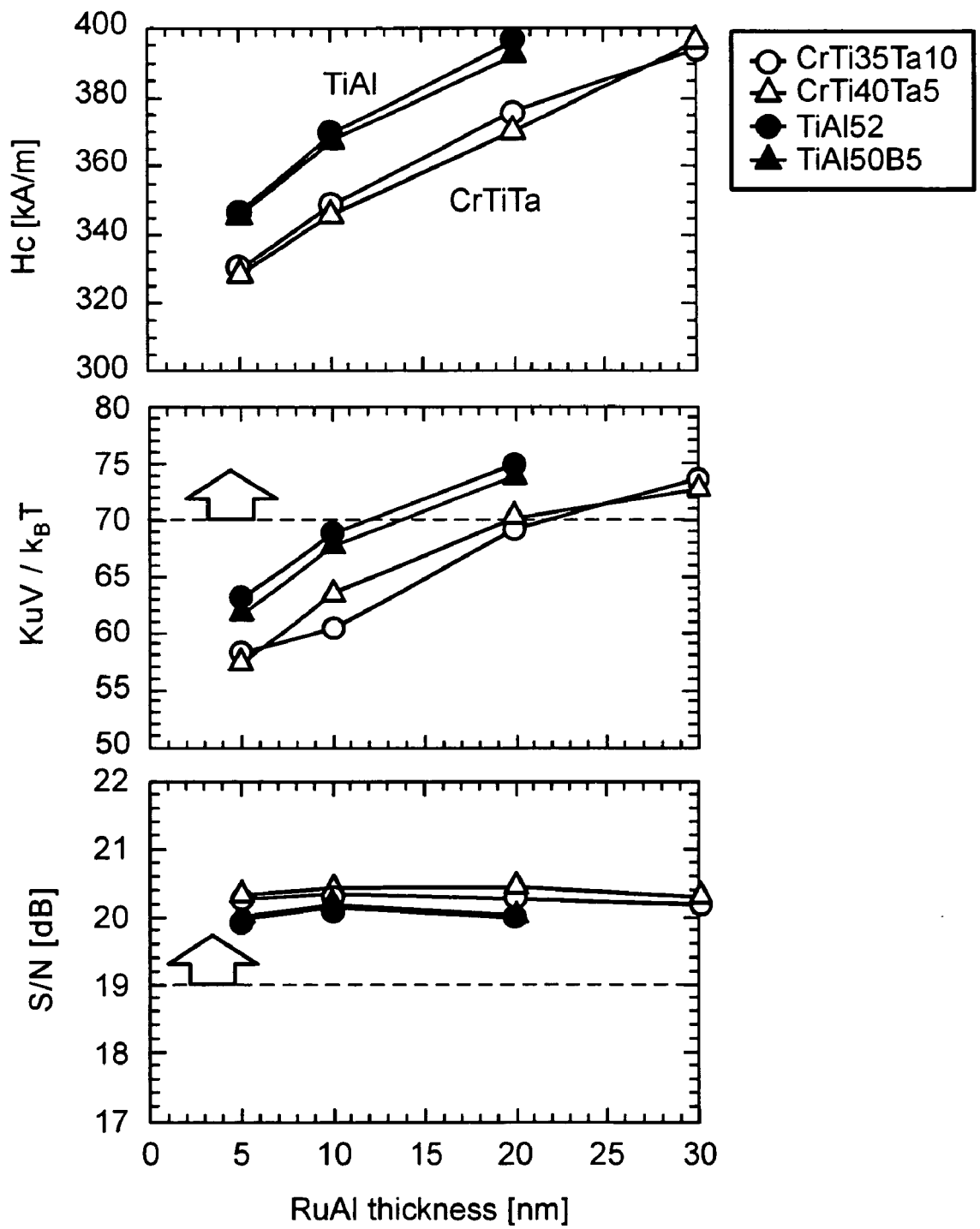
FIG. 4 presents graphs comparatively showing Hc, Ku·v/kT, and S/N achieved by using different materials for a first seed layer of Example 1.

Experiments were performed using the media having the structure of FIG. 2, wherein the second seed layers were formed from Ru and 50% atomic weight of Al that achieved good orientation and the first seed layers were formed from different materials. FIG. 4 shows coercive forces (Hc), Ku·v/kT, and S/N of first seed layers 11 formed from: (1) Cr, 35% atomic weight of Ti and 10% atomic weight of Ta; (2) Cr, 40% atomic weight of Ti, and 5% atomic weight of Ta; (3) Ti and 52% atomic weight of Al; and (4) Ti, 50% atomic weight of Al, and 5% atomic weight of B. Here, S/N was obtained by recording a signal of 377 kFCI and dividing a read output of the signal by noise (noise including system-based nose and medium noise). In order to realize a recording density of 70 Gigabits or more per one square inch, S/N of 10 dB or more is required in view of the reproduction characteristic. In order to secure satisfactory thermal demagnetization as a magnetic disk device, Ku·v/kT must be 70 or more.

From the results shown in FIG. 4, differences depending on subtle differences in composition are hardly observed in the materials although there is a certain difference between the CrTiTa-based material and the TiAl-based material. All the media achieved a satisfactory S/N. However, it was found that the RuAl second seed layer thickness must be 20 nm or more when the first seed layer is formed from the CrTiTa-based material or must be 12.5 nm or more when the first seed layer is formed from TiAl-based material in order to achieve a satisfactory Ku·v/kT. Although the examples of first seed layers 11 formed from CrTiTa and TiAl have been described, similar results were obtained by the use of CrTi and CrTa, that is, values of S/N and Ku·v/kT were close to those achieved by the use of CrTiTa. When Cr, NiTa, Ta, CoCrZr, or NiCrZr was used to form first seed layer 11, S/N was markedly poor to reveal that they are not suitable as the materials for first seed layer 11. It is possible that the size of the crystal particles of the second seed layer is markedly increased by the use of these materials. In view of the foregoing results, it is necessary to use materials containing Cr and one or both of Ti and Ta or the TiAl-based material to form first seed layer 11.

Figure 5:
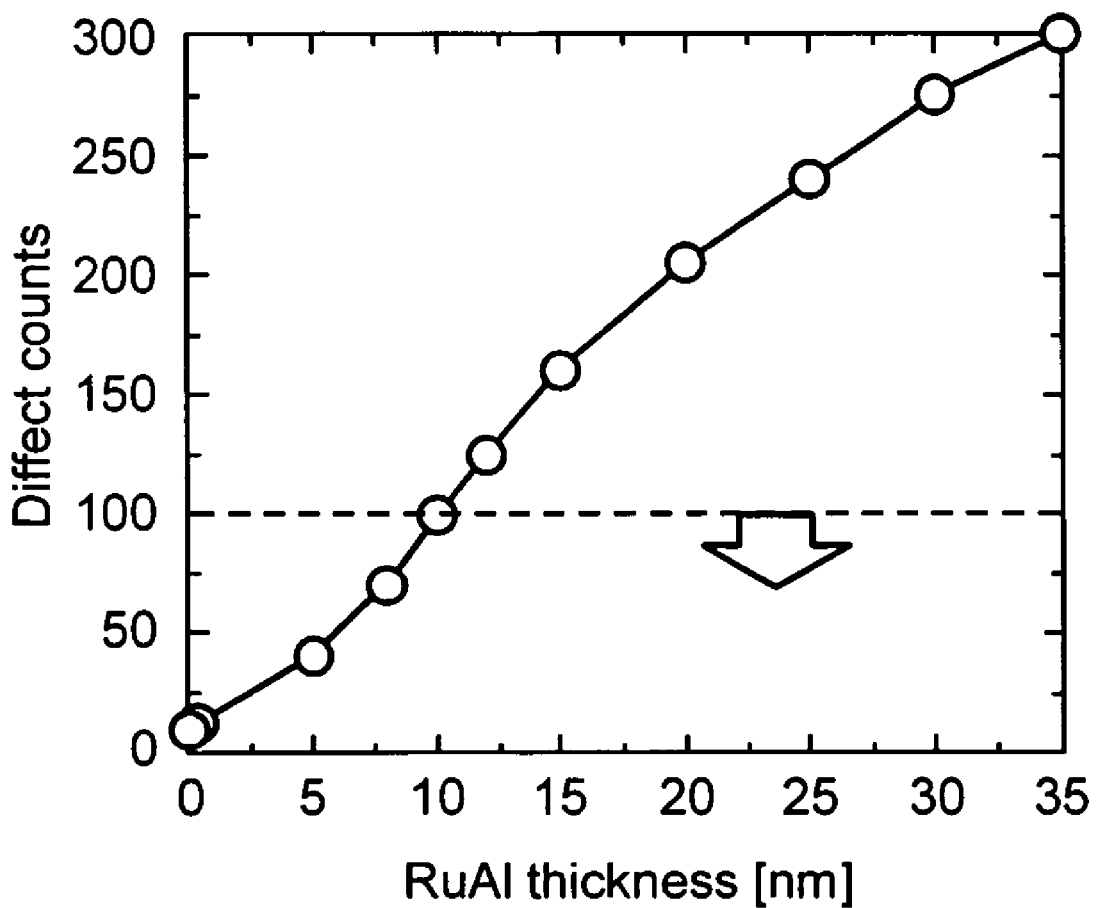
FIG. 5 is a graph showing a relationship between a thickness of the second seed layer of Example 1 and defect counts.

FIG. 5 shows results of examination of a relationship between the thickness of RuAl second seed layer 12 and defect counts. A composition of Ti, 50% atomic weight of Al, and 5% atomic weight of B was used to form first seed layer 11 having a thickness of 30 nm, and a composition of Ru and 50% atomic weight of Al was used to form second seed layer 12. Other parts of the structure are the same as those shown in FIG. 2. The vertical axis of the graph indicates defect counts per plane. The defect counts were obtained as results of examinations in which using a read/write head, a region in which the read output is reduced by 80% or more over a length of 0.1 Rm or more in the track direction is counted as one defect. It is apparent from the graph that the defect counts increase with the increase in RuAl thickness. In order to attain a satisfactory read output, the defect counts per plane must be 100 or less and, therefore, the thickness of RuAl second seed layer 12 must be 10 nm or less. Further, since it is possible to realize a great reduction in defect counts if the thickness of second seed layer 12 is 5 nm or less, it is more preferable that the thickness of RuAl is 5 nm or less (0.3 nm or more). Similar results were obtained by using Re and 50% atomic weight of Al as second seed layer 12, and it was found that the thickness of the ReAl second seed layer must also be 10 nm or less.

Further, since Ru and Re are very expensive materials, it is preferred to reduce the thickness of second seed layer 12 in view of a reduction in cost. Accordingly, provision of first underlayer 13 formed from inexpensive materials was studied to compensate for the reduction in thickness of second seed layer 12. An intermetallic compound based on bcc structure used for first underlayer 13 is preferred compared with materials having bcc structure such as the Cr alloy since the size of the fine crystal particles is fine even when its thickness is increased. FIG. 1 is a sectional view of a medium having a basic structure of the present invention. The difference between the film structures of FIG. 1 and FIG. 2 is that first underlayer 13 is provided between second seed layer 12 and second underlayer 14 in the structure of FIG. 1.

Figure 6:
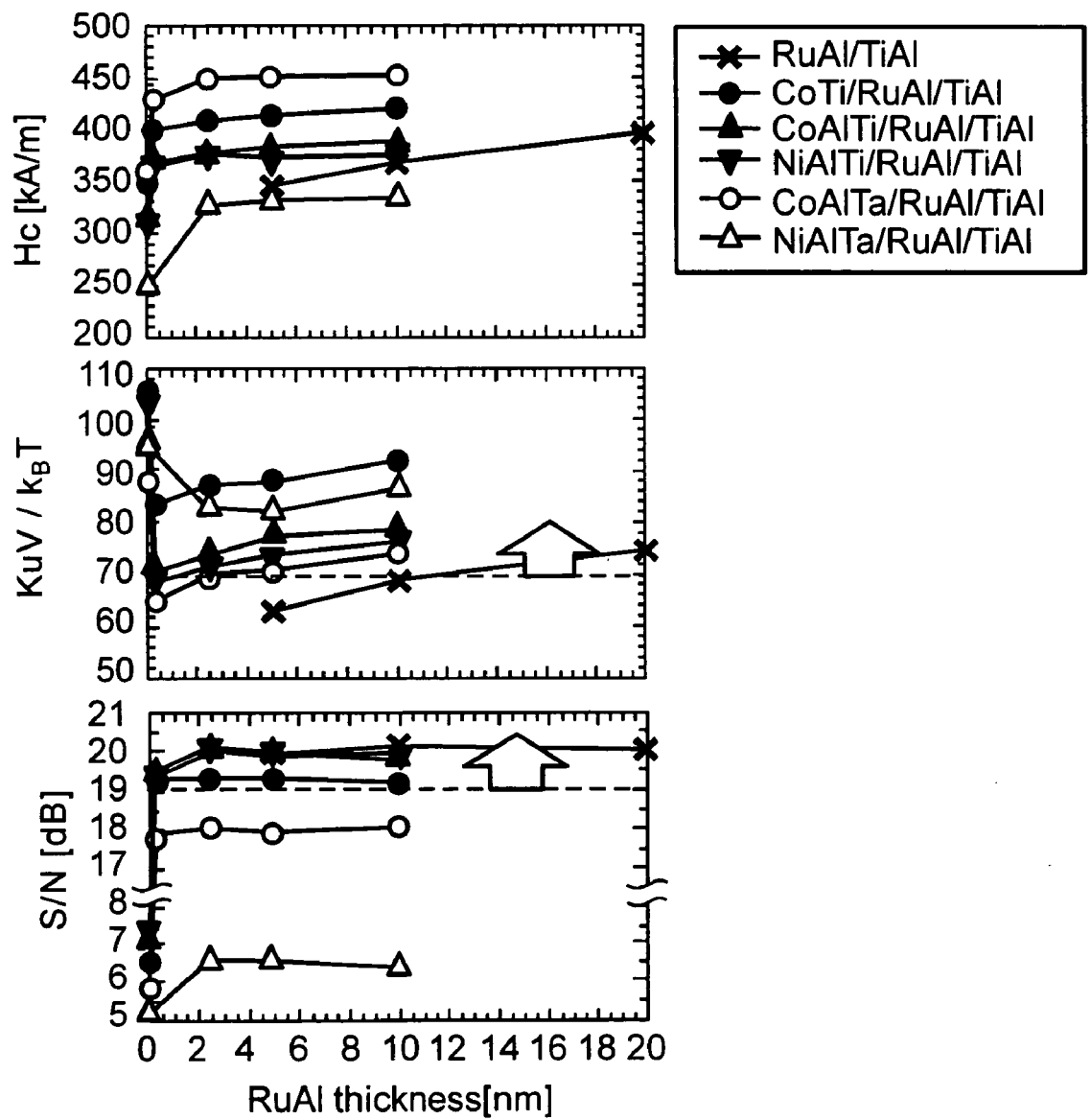
FIG. 6 presents graphs comparatively showing Hc, Ku·v/kT, and S/N achieved by using different materials for a first underlayer of Example 1.

FIG. 6 shows Hc, Ku·v/kT, S/N achieved using compositions of: (1) Co and 50% atomic weight of Ti; (2) Co, 25% atomic weight of Al, and 25% atomic weight of Ti; (3) Ni, 25% atomic weight of Al, and 25% atomic weight of Ti; (4) Co, 25% atomic weight of Al, and 25% atomic weight of Ta; and (5) Ni, 25% atomic weight of Al, and 25% atomic weight of Ta as the first underlayer. In the measurement of Hc, Ku·v/kT, S/N, the first underlayer thickness was fixed to 30 nm; TiAl was used to form a first seed layer having a thickness of 30 nm; and the RuAl second seed layer thickness was changed. As a comparative example, data obtained by increasing the RuAl second seed layer thickness without the provision of the first underlayer is shown (the curve plotted with x in each graph). In the medium structure of the comparative example, the RuAl seed layer thickness must be 12.5 nm or more to satisfy Ku·v/kT and S/N. However, when first underlayer 13 is formed from CoTi, COAlTi, or NiAlTe, the satisfactory Ku·v/kT and S/N are achieved when the RuAl second seed layer thickness is reduced. On the other hand, the CoAlTa first underlayer and the NiAlTa first underlayer achieve a satisfactory Ku·v/kT, but do not achieve a satisfactory S/N.

The upper limit of the thickness of second seed layer 12 is limited in terms of defect counts and cost; that is, it must be 10 nm or less. More preferably, the thickness may be 5 nm or less. In contrast, the lower limit of the thickness depends on whether the crystallinity and the preferred orientation plane of second underlayer 13 are controlled by adjusting the thickness. It is apparent from the results shown in FIG. 6 that a thickness of 2.5 nm causes no problem. The lower limit of the thickness of a second seed layer that is formed by sputtering and functions as a practical film was found to be 0.3 nm. Thus, the thickness of the second seed layer must be in the range of 0.3 to 10 nm, and more preferably in the range of 0.3 to 5 nm.

Figure 7:
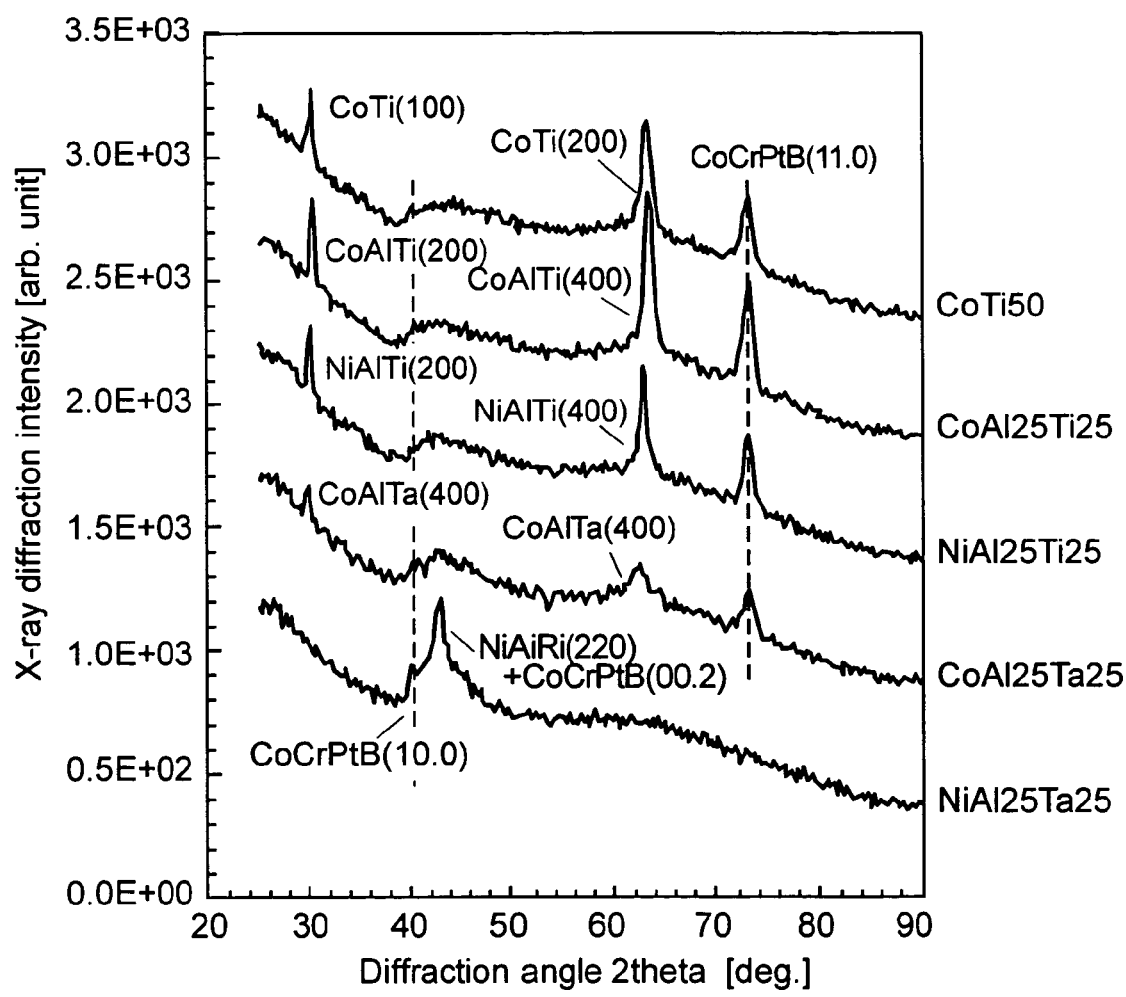
FIG. 7 is a graph comparatively showing crystal orientations achieved by using different materials for the first underlayer of Example 1.

FIG. 7 shows results of examination of the crystal orientation of media of the present invention. In the respective samples having a CoTi first underlayer, a CoAlTi first underlayer, and a NiAlTi first underlayer, (100) and (200) diffraction peaks appear clearly in the first underlayer, and strong orientation in the direction of (11.0) of the magnetic layer is observed. In the sample having a CoAlTa first underlayer, (100) and (200) diffraction peaks in the first underlayer and (11.0) orientation in the magnetic layer are observed, but the intensities thereof are weaker than those of the respective samples having the CoTi first underlayer, the CoAlTi first underlayer, and the NiAlTi first underlayer. In the sample having a NiAlTa first underlayer, an easy magnetization axis in the magnetic layer is oriented in the vertical direction. It is possible that such orientation differences account for the results shown in FIG. 7.

Experiments were performed using samples having the above medium structure and changing a first underlayer material with the thickness of a RuAl second seed layer being fixed to 5 nm. Results of the experiments are shown in Table 1. The samples achieved a satisfactory Ku·v/kT of 70 or more. In turn, S/N of the samples are satisfactory when the first underlayer materials were Co and 50% atomic weight of Ti, Co and 50% atomic weight of Al, Co, 25% atomic weight of Al, and 25% atomic weight of Ti, Ni and 50% atomic weight of Ti, Ni and 50% atomic weight of Al, and Ni, 25% atomic weight of Al, and 25% atomic weight of Ti, but S/N of the samples having first underlayers formed from other materials were unsatisfactory.

TABLE 1

| First Underlayer | S/N [dB] | Judgment |
| --- | --- | --- |
| CoTi50 | 19.23 | p |
| CoAl50 | 19.38 | p |
| CoAl25Ti25 | 20.06 | p |
| NiTi50 | 19.19 | p |
| NiAl50 | 19.03 | p |
| NiAl25Ti25 | 20.09 | p |
| CoAL25Zr25 | 5.28 | x |
| CoAl25Nb25 | 13.82 | x |
| CoAl25Ta25 | 18.04 | x |
| NiAl25Zr25 | 5.89 | x |
| NiAl25Nb25 | 14.72 | x |
| NiAl25Ta25 | 6.48 | x |
| FeAl50 | 17.41 | x |
| FeTi50 | 17.98 | x |
| FeV50 | 14.66 | x |
| MnV50 | 4.32 | x |

From the above results, it is apparent that materials that can be used for first underlayer 13 are not always any intermetallic compound having B2 structure or L21 structure; only specific materials may be used. The materials to be used as first underlayer 13 must contain at least one of Co and Ni and one or both of Al and Ti. Co and Ni are materials that can achieve hcp structure, and Al and Ti are materials that can achieve fcc structure. When the crystal pattern is formed and the preferred orientation plane is determined by second seed layer 12 disposed under first underlayer 13, second underlayer 14 formed on such combination of materials is possibly excellent in crystallinity and crystal orientation.

Table 2 shows results obtained by using Re and 50% atomic weight of Al in place of RuAl as second seed layer 12. It was confirmed that first underlayers which achieved good results in combined use with a RuAl second seed layer also achieve similar results when a ReAl second seed layer is used in combination therewith.

TABLE 2

| First Underlayer | S/N [dB] | Judgment |
| --- | --- | --- |
| CoTi50 | 19.71 | p |
| CoAl50 | 19.42 | p |
| CoAl25Ti25 | 20.37 | p |
| NiTi50 | 19.44 | p |
| NiAl50 | 19.36 | p |
| NiAl25Ti25 | 20.21 | p |

Figure 8:
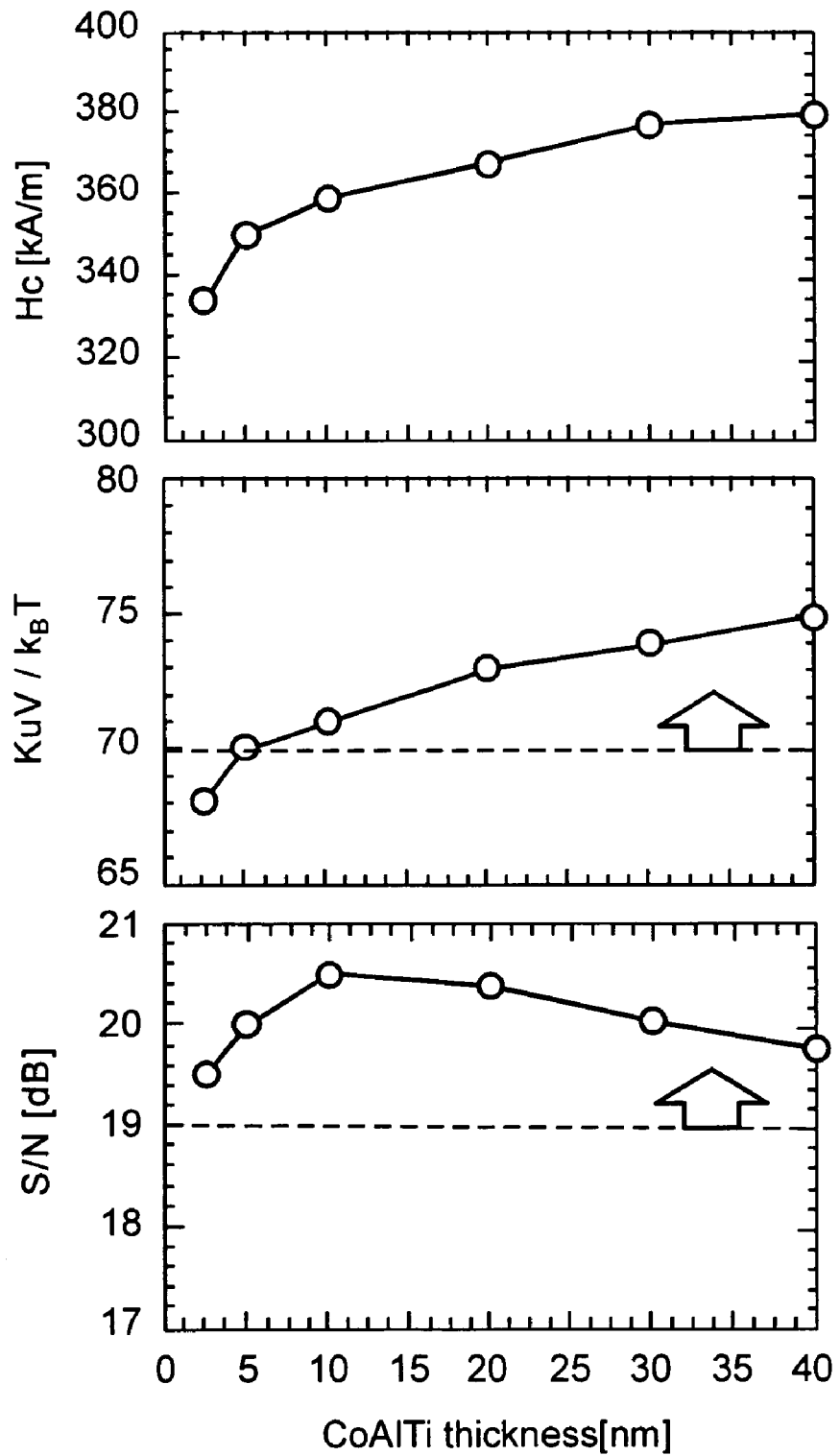
FIG. 8 presents respective graphs comparatively showing Hc, Ku·v/kT, and S/N achieved by changing a thickness of the first underlayer of Example 1.

Finally, FIG. 8 shows results of experiments concerning the thickness of first underlayer 13. A composition of Cr, 35% atomic weight of Ti, and 10% atomic weight of Ta was used to form a first seed layer 11. A composition of Ru and 50% atomic weight of Al was used to form a second seed layer 12. A composition of Co, 25% atomic weight of Al, and 25% atomic weight of Ti was used to form a first underlayer 13 in each of the samples. The thickness of each of the first seed layers was 30 nm, and the thickness of each of the second seed layers was 5 nm. First underlayers 13 of the samples were varied in thickness from one another. When the thickness of first underlayer 13 was less than 5 nm, Ku·v/kT fell undesirably short of 70. On the other hand, Ku·v/kT and S/N were satisfactory even when the thickness was increased to 40 nm, but dust and cost undesirably increase with the increase in thickness. Thus, it was confirmed that the preferred thickness of first underlayer 13 is 30 nm.

Example 2

A layer structure of a medium of this example is now described with reference to the sectional view of FIG. 1. A first seed layer formed of Cr, 35% atomic weight of Ti, and 10% atomic weight of Ta first seed layers 11 was formed on a glass substrate 10 having an outer diameter of 65 mm. The thickness of the first seed layer was changed for the experiments. A surface of first seed layer 11 was heated with an infrared ray lamp with its power set to 2.18 kW, and then a Cr second seed layer 12 having a thickness of 5 nm was formed on first seed layer 11. On the second seed layer, a Co, 25% atomic weight of Al, and 25% atomic weight of Ti was used as a first underlayer 13 having a thickness of 30 nm and a composition of Cr and 20% atomic weight of Mo was used as a second underlayer 14 having a thickness of 5 nm were formed in this order. Formed on the second underlayer 14 was a composition of Co, 14% atomic weight of Cr, and 4% atomic weight of Pt as a lower magnetic layer 15, a Ru intermediate layer 16 having a thickness of 0.6 nm, and a composition of Co, 18% atomic weight of Cr, 14% atomic weight of Pt, and 8% atomic weight of B as a upper magnetic layer 17 having a thickness of 15.5 nm in this order. On the upper magnetic layer 17, a C protection film 18 containing nitrogen and having a thickness of 3.5 nm was formed.

The ultimate temperature varies depending on the thickness of the first seed layer when the medium is heated by the infrared ray with its power fixed. Since heat capacity is reduced with the reduction in thickness of the first seed layer, the temperature is raised with lower power when the thickness is reduced. In short, a thinner first seed layer is easily heated. Accordingly, the infrared ray lamp momentarily heats the first seed layer or the substrate surface, not the overall substrate. If the power of the infrared ray lamp is fixed to 2.18 kW, the ultimate temperatures are 300° C. and 440° C. when the first seed layer thicknesses are 30 nm and 5 nm, respectively.

Figure 9:
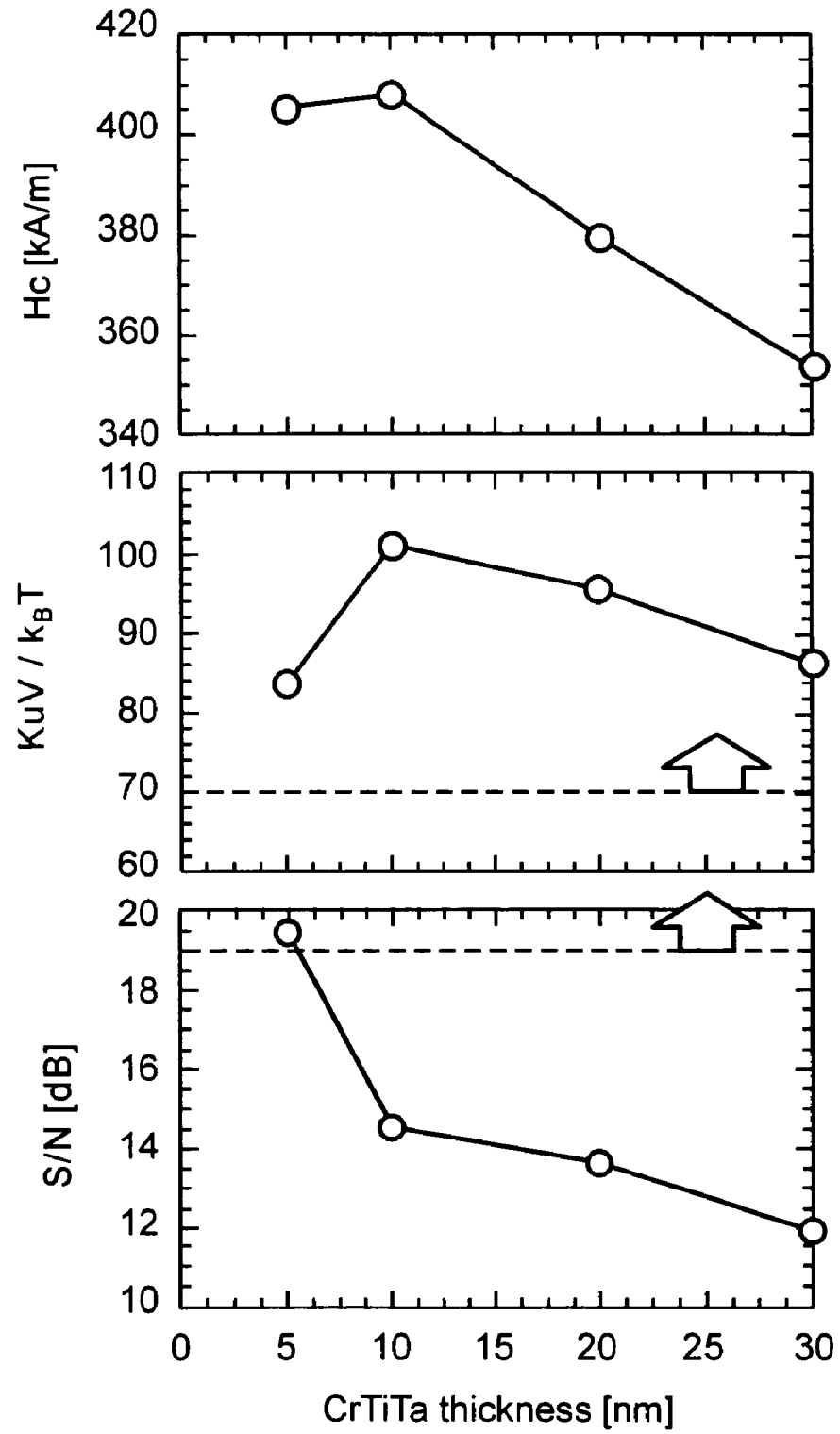
FIG. 9 presents respective graphs comparatively showing Hc, Ku·v/kT, and S/N achieved by changing a thickness of a first underlayer of Example 2.
Figure 10:
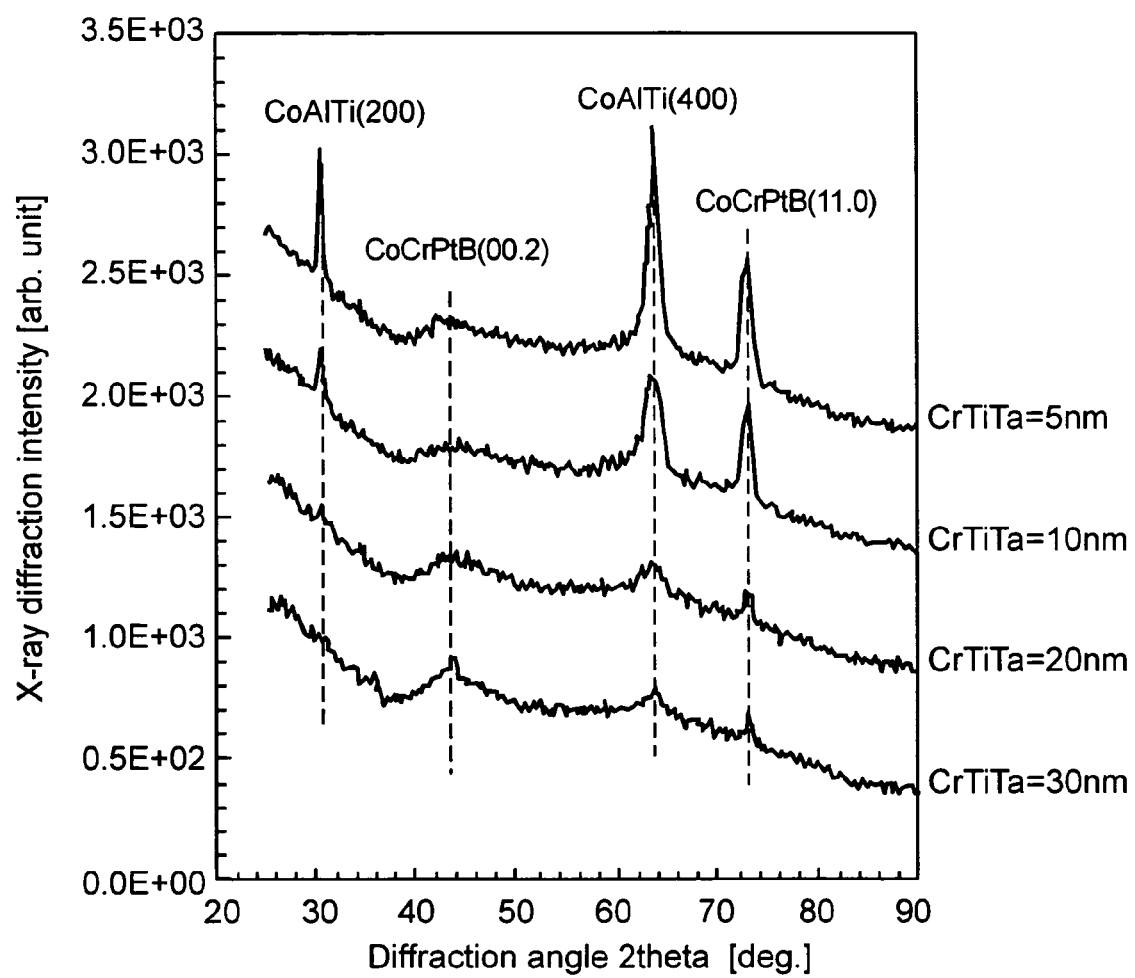
FIG. 10 presents graphs showing crystal orientations achieved by changing the thickness of the first underlayer of Example 2.

FIG. 9 shows changes in Hc, Ku·v/kT, and S/N caused by the changes in thickness of the CrTiTa first seed layer. S/N was unsatisfactory when the CrTiTa was thick (temperature is lower), but S/N increased with reduction in the thickness (with the increase in temperature). A satisfactory S/N was achieved when the thickness was 5 nm. FIG. 10 shows the results of examination of the changes of crystal orientation. As is apparent from FIG. 10, the crystallinity and the crystal orientation are improved with the reduction in CrTiTa thickness. This means that the increase in the substrate surface temperature enables a structure that sufficiently exhibits the so-called template effect by which perfection of the crystal pattern owing to the second seed layer is promoted. Results of examination of materials exhibiting the template effect are shown in Table 3.

TABLE 3

| Second Seed Layer | S/N [dB] | Judgment |
|---|---|---|
| Cr | 19.48 | p |
| CrTi20 | 19.69 | 0 |
| CrMo20 | 19.09 | 0 |
| CrW20 | 19.13 | p |
| CrV20 | 17.14 | X |
| CrNb20 | 10.76 | X |

The above results were obtained by using various Cr alloys having bcc structure in place of Cr to form the second seed layer. The thickness of a CrTiTa first seed layer was 5 nm, and the second seed layer thickness was 5 nm, too. Owing to the template effect, media having excellent S/N are realized not only by using Cr but also by using CrTi, CrMo, and CrW. On the other hand, it is apparent from the results that CrV and CrNb among the Cr alloys cannot exhibit the template effect. It is considered that the template effect was not achieved with the use of CrV and CrNb because CrV causes an increase in particle size and CrNb causes poor crystallinity.

Figure 11:
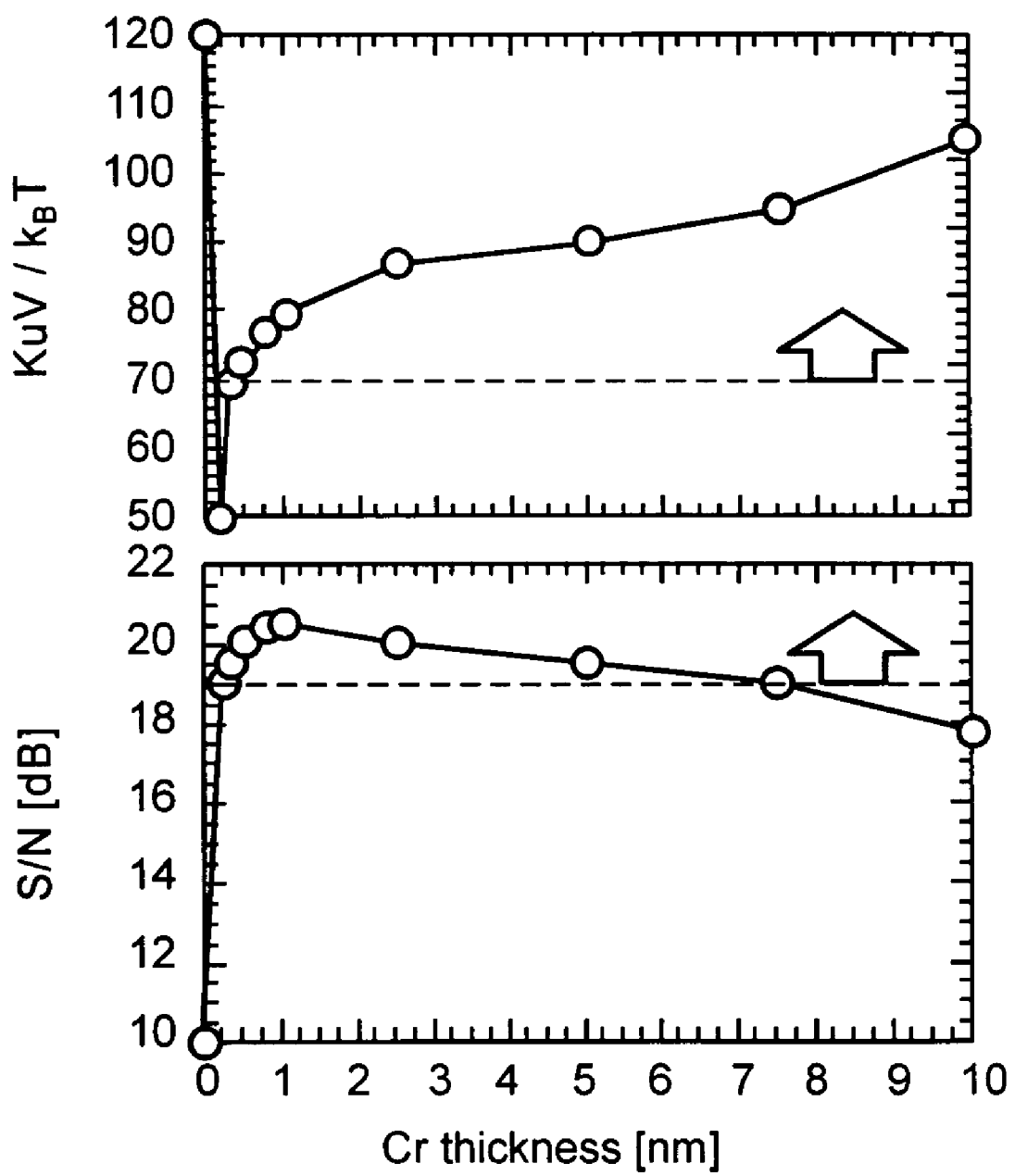
FIG. 11 presents graphs comparatively showing Hc, Ku·v/kT, and S/N achieved by changing the thickness of the first underlayer of Example 2.

Results of examination concerning thicknesses of the second seed layer which can achieve the template effect are shown in FIG. 11. The results obtained by using a Cr second seed layer are shown by way of example. When the first seed layer is not formed, S/N is remarkably poor since the crystallinity and the orientation in the first underlayer are diminished. When the thickness of the second seed layer is more than 0 and less than 0.3, the crystal particles are extremely fine so that Ku·v/kT is reduced too much. If the thickness exceeds 7.5 nm, the particle size is enlarged too much and degrades the S/N. The optimum thickness is in the range of 0.3 to 7.5 nm.

Further, in this example, the composition of each of the first seed layer, the second seed layer, the first underlayer, the second underlayer of the medium is limited and the combination of the layer compositions is important. The compositions other than that of the first underlayer are limited to those described in Example 1. Since Ru and Re, which are expensive materials, are not used in this example for fabricating the medium, it is possible to provide a more inexpensive medium according to this example. However, S/N of the medium of this example is slightly degraded as compared with the medium of Example 1.

Effect of the Invention

In the longitudinal magnetic recording medium of the present invention, a first seed layer, a second seed layer, a first underlayer, a second underlayer, and a magnetic layer are formed on a nonmagnetic substrate in this order. A material containing at least Al and any one of Ru and Re is used to form the second seed layer, and a material at least containing any one of Co and Ni and one or both of Al and Ti is used to form the first underlayer. It is also possible to use Cr or a Cr alloy containing Cr and at least one element selected from the constituent element group A consisting of Ti, Mo, and W to form the second seed layer.

Owing to the above-described structure of the first seed layer, the second seed layer, the first underlayer, and the second underlayer, the magnetic layer is composed of fine crystal particles and achieves a strong longitudinal orientation of the easy magnetization axis. Therefore, it is possible to provide a low-cost longitudinal magnetic recording medium having a recording density of 70 Gigabits or more per square inch.

What is claimed is:

1. A magnetic recording medium comprising:
   a substrate; and
   a laminated layer formed on the substrate,
   the laminated layer comprising a first seed layer, a second seed layer, a first underlayer, a second underlayer, and a magnetic layer,
   wherein the second seed layer comprises Cr or a Cr alloy containing Cr and at least one element selected from the group consisting of: Ti, Mo, and W,
   the first underlayer comprising at least one of Co or Ni,
   the first underlayer further comprising one of Al, Ti, or Al and Ti,
   wherein the first seed layer comprises at least 35 at. % to 65 at. % of Ti and at least 35 at. % to 65 at. % of Al.

2. A magnetic recording medium comprising:
   a substrate; and
   a laminated layer formed on the substrate,
   the laminated layer comprising a first seed layer, a second seed layer, a first underlayer, a second underlayer, and a magnetic layer,
   wherein the second seed layer comprises Cr or a Cr alloy containing Cr and at least one element selected from the group consisting of: Mo and W,
   the first underlayer comprising at least one of Co or Ni,
   the first underlayer further comprising one of Al, Ti, or Al and Ti,
   wherein the first seed layer comprises at least Cr and one of Ti, Ta, or Ti and Ta.

3. The magnetic recording medium according to claim 1, wherein a thickness of the second seed layer is in the range of 0.3 to 7.5 nm.

4. The magnetic recording medium according to claim 3, wherein a thickness of the second seed layer is in the range of 0.3 to 2.5 nm.

5. The magnetic recording medium according to claim 2, wherein the first seed layer comprises at least 35 at. % to 70 at. % of Cr.

6. The magnetic recording medium according to claim 2, wherein a thickness of the second seed layer is in the range of 0.3 to 7.5 nm.

7. The magnetic recording medium according to claim 6, wherein a thickness of the second seed layer is in the range of 0.3 to 2.5 nm.

8. The magnetic recording medium according to claim 2, wherein the first seed layer is formed on the substrate.

9. The magnetic recording medium according to claim 8, wherein the first seed layer is formed adjacent to the substrate.

10. A magnetic recording medium comprising:
    a substrate; and
    a laminated layer formed on the substrates, the laminated layer comprising a first seed layer, a second seed layer, a first underlayer, a second underlayer, and a magnetic layer;
    wherein the first seed layer is provided between the substrate and the second seed layer;
    wherein the second seed layer is provided between the first seed layer and the first underlayer;
    wherein the first underlayer is provided between the second seed layer and the second underlayer;
    wherein the second underlayer is provided between the first underlayer and the magnetic layer;
    wherein the first seed layer comprises at least Cr and one of Ti, Ta, or Ti and Ta;
    wherein the second seed layer comprises Cr or a Cr alloy containing Cr and Ti;
    wherein the first underlayer comprises at least one of Co or Ni and comprises one of Al, Ti, or Al and Ti; and
    wherein the first and second seed layer has a higher Cr content that the first seed layer.

11. The magnetic recording medium according to claim 10, wherein the first seed layer comprises 35 at. % to 70 at. % of Cr.

12. A magnetic recording medium comprising:
    a substrate; and
    a laminated layer formed on the substrate,
    the laminated layer comprising a first seed layer, a second seed layer, a first underlayer, a second underlayer, and a magnetic layer,
    wherein the second seed layer comprises Cr or a Cr alloy containing Cr and at least one element selected from the group consisting of: Ti, Mo, and W,
    the first underlayer comprising at least one of Co or Ni,
    the first underlayer further comprising one of Al, Ti, or Al and Ti,
    wherein the first seed layer comprises at least Cr and one of Ti, Ta, or Ti and Ta,
    wherein a thickness of the second seed layer is in the range of 0.3 to 7.5 nm.

13. The magnetic recording medium according to claim 12, wherein a thickness of the second seed layer is in the range of 0.3 to 2.5 nm.

* * * * *